US012047261B1

(12) United States Patent
Rao et al.

(10) Patent No.: US 12,047,261 B1
(45) Date of Patent: Jul. 23, 2024

(54) DETERMINING CONTENT PERCEPTION

(71) Applicant: Amazon Technologies, Inc., Seattle, WA (US)

(72) Inventors: Siddhartha Shankara Rao, Seattle, WA (US); John Joseph Dunne, Bremertom, WA (US)

(73) Assignee: Amazon Technologies, Inc., Seattle, WA (US)

( * ) Notice: Subject to any disclaimer, the term of this patent is extended or adjusted under 35 U.S.C. 154(b) by 31 days.

(21) Appl. No.: 17/219,190

(22) Filed: Mar. 31, 2021

(51) Int. Cl.
*H04L 43/0811* (2022.01)
*G06N 20/00* (2019.01)
*G10L 13/08* (2013.01)
*G10L 15/06* (2013.01)
*G10L 15/08* (2006.01)
*G10L 25/60* (2013.01)
*H04L 43/0817* (2022.01)
*H04L 65/80* (2022.01)

(52) U.S. Cl.
CPC .......... *H04L 43/0811* (2013.01); *G06N 20/00* (2019.01); *G10L 13/08* (2013.01); *G10L 15/063* (2013.01); *G10L 15/083* (2013.01); *H04L 43/0817* (2013.01); *H04L 65/80* (2013.01); *G10L 25/60* (2013.01)

(58) Field of Classification Search
None
See application file for complete search history.

(56) References Cited

U.S. PATENT DOCUMENTS

| | | | |
|---|---|---|---|
| 9,686,338 B1* | 6/2017 | Farrell | H04L 65/612 |
| 10,192,546 B1* | 1/2019 | Piersol | G10L 15/08 |
| 2013/0103624 A1* | 4/2013 | Thieberger | G06K 9/6256 706/12 |
| 2014/0267899 A1* | 9/2014 | Radloff | H04N 21/2393 348/390.1 |
| 2017/0093942 A1* | 3/2017 | Danielsson | H04W 84/042 |
| 2018/0034881 A1* | 2/2018 | Truax | H04L 65/762 |
| 2018/0270347 A1* | 9/2018 | Rangarajan | H04L 41/5067 |
| 2019/0306211 A1* | 10/2019 | Swanston | G06Q 30/0241 |
| 2019/0354875 A1* | 11/2019 | Madden | G06F 3/0304 |
| 2021/0084145 A1* | 3/2021 | Pham | H04M 3/5175 |
| 2021/0405743 A1* | 12/2021 | Boesel | G06F 3/0346 |

* cited by examiner

Primary Examiner — Scott B Christensen
(74) Attorney, Agent, or Firm — BakerHostetler

(57) ABSTRACT

Implementations for determining content perception by a participant in a media session by analyzing content are described. A content signal, such as an audio signal or a video signal, is received during a media session. A transcript of the content can be determined. Feedback, such as a pre-determined phrase, related to content perception by a participant in the media session is determined using a learning algorithm at the device. Metadata regarding the media session is collected in response to the feedback related to the content perception. The indication of the feedback related to the content perception and the metadata regarding the media session is then sent. In response, one or more adjustments to the media session are received. The one or more adjustments to the media session can be determined based on the indication of the feedback related to the content perception, the metadata regarding the media session, and network performance information.

17 Claims, 7 Drawing Sheets

DETERMINING CONTENT PERCEPTION

BACKGROUND

Users may experience difficulty perceiving audio and video during a media conference. These difficulties may be based on performance of input and/or output devices, network connections, and media conference provider servers. While users can identify degraded perception quality, users may not be able to determine the cause of the degraded perception quality. For example, users may not know that a network is experiencing excessive latency or that the user device is undergoing a heavy background processing load. Therefore, there is a need to determine content perception by a user and to identify possible adjustments to improve content perception.

BRIEF DESCRIPTION OF THE DRAWINGS

The detailed description is set forth below with reference to the accompanying figures. The use of the same reference numbers in different figures indicates similar or identical items. The systems depicted in the accompanying figures are not to scale and components within the figures may be depicted not to scale with each other.

DETAILED DESCRIPTION

Figure 1:
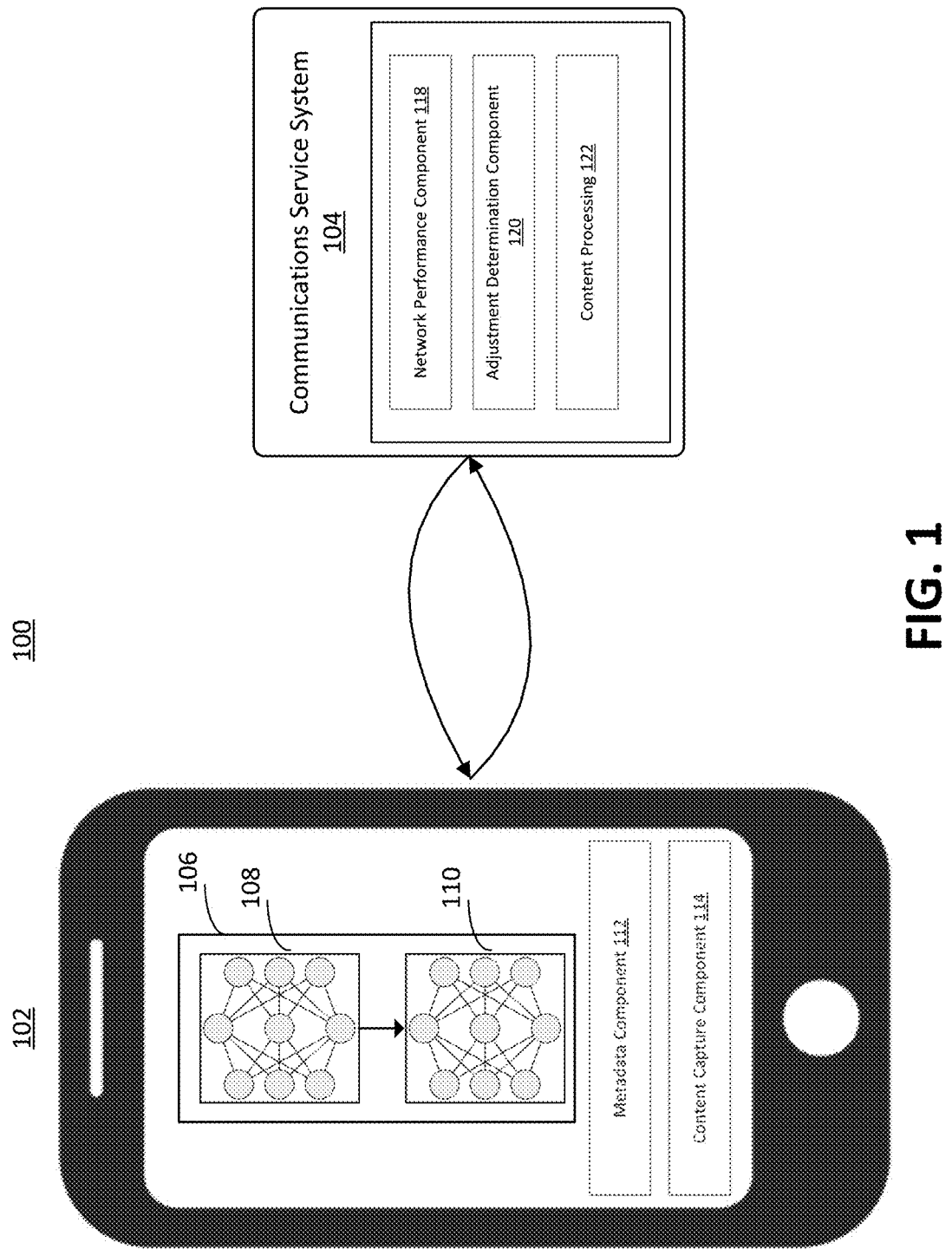
FIG. 1 schematically illustrates a high-level architecture of an input device communicating with a communications service system in a service provide network.

Techniques and architecture for determining content perception by a user and identifying possible adjustments to improve content perception are described. A content signal, such as an audio signal and/or a video signal, can be received at an input device of a participant in a media session. Because of privacy, encryption, and regulatory considerations, the content signal may be processed by the input device and not by network service. The processing can include automatic content recognition, such as automatic speech recognition, and natural language understanding to identify feedback related to content perception by the user using the input device. For example, the user may state that they cannot hear another participant in the media session or that the quality of the audio or video signal is not acceptable. Upon recognition of the feedback related to the content perception, the input device can collect metadata regarding the media session. The metadata can include connection performance information, device feature information, and/or device performance information. The input device can also collect a sample of the content from a time duration before the feedback related to the content perception. The metadata and/or the sample of the content can be sent to the network service, such as a media conferencing service, a file hosting service, an interactive electronic gaming service, etc.

The network service can then determine adjustments to improve content perception based on the received metadata, the content sample, and/or network performance information. The network performance information can be collected by the network service and can include availability and/or latency of the network. The adjustments to the media session can include changing a modality of connection, changing a connection network, changing a host server of the media session, changing a location of the input device receiving the content, changing the input device, changing the modality of the input, changing the output device, changing the modality of output, and/or encoding voice in audio content as text and then playing the text using text-to-speech technology. The adjustments to the media session can be determined by a human operator or automatically using, for example, a learning algorithm. The learning algorithm can be trained using information from prior media sessions in which content perception was acceptable or in which content perception was improved following adjustments. In some embodiments, the learning algorithm can be a pre-trained model that is received. The recommended adjustments can be based on a classification of the determined a feedback. For example, feedback classified as a network disruption may cause a recommendation to change the connection network. The recommended adjustments can then be sent to the user device for action by the user and/or for automatic implementation by the input device.

Certain implementations and embodiments of the disclosure are described more fully below with reference to the accompanying figures, in which various aspects are shown. However, the various aspects may be implemented in many different forms and should not be construed as limited to the specific implementations described herein. The disclosure encompasses variations of the described embodiments.

FIG. 1 schematically illustrates a high-level architecture 100 of an input device communicating with a communications service system in a service provide network, according to an embodiment. An input device 102, such as a smartphone, may receive content, such as audio signals and/or video signals, from a user of the input device 102 and transmit that content to a communication service system 104 during a media session. Content received from one participant in the media session can be broadcast to the other participants of the media session via the communication service system 104. Audio content can be captured using a microphone of the smartphone 102 and video content can be captured using a camera of the smartphone 102. The input device 102 can be any type of input device configured to capture content, such as a camera, a microphone, a headset, a laptop, a telephone, a computer, a tablet, etc. In some embodiments, a plurality of input devices can receive content from a plurality of users and transmit that content to the communication service system during a multiparty media session. In some embodiments, a user may be associated with more than one input device.

The input device 102 includes a speech processing component 106 to identify feedback related to content perception by the user of the user device 102. The speech processing component 106 includes an automatic speech recognition (ASR) component 108 and a natural language understanding (NLU) component 110. The ASR component 108 converts audio received at the input device 102 into text by transcribing audio data into text data representing the words contained in the audio data. As such, a transcription of at least a portion of the audio data can be temporarily created by the input device 102. However, the transcription of the audio data is not transmitted to the communication service system 104, as described in greater detail below. The ASR component 108 may be implemented as a learning algorithm, such as a machine learning algorithm, artificial intelligence algorithm, and/or other statistical modeling algorithm. The ASR component 108 may include an acoustic front end that transforms the audio data received from a microphone into data for processing by a speech recognition engine. The speech recognition engine then compares the speech recognition data from the acoustic front end with acoustic models, language models, and other data models for recognizing the speech conveyed in the audio data.

Once the speech in the audio data has been recognized, it may be sent to the NLU component 110 for identifying phrases related to content perception. The NLU component 110 may be implemented as a learning algorithm, such as a machine learning algorithm, artificial intelligence algorithm, and/or other statistical modeling algorithm. The NLU component 110 makes semantic interpretations of the text. That is, the NLU component 110 determines the meaning behind the text based on the individual words and then interprets a text string to derive feedback expressed by the user. For example, if the text received from the ASR component 108 includes a phrase such as "Can you hear me know?", "What did you say?", "Could you please speak up?", "I can't hear you.", "You broke up.", "I am getting a lot of interference.", "Your voice is not coming through.", "I can't see you.", "Your video is pixelated.", "You look fuzzy.", the NLU component 110 may determine that the user is unable to perceive the audio or video received from the communications service system 104 or that the quality of the perception is low. In another example, if the user continually repeats himself, feedback indicating poor content perception may be determined. In yet another example, if the text received from the ASR component 108 includes a phrase such as "You sound great.", "The connection is good.", "Everything is crystal clear.", "Great quality.", "I can hear you.", the NLU component 110 may determine that the user is able to perceive the audio or video received from the communications service system 104 or that the quality of the perception is high.

The NLU component 110 may also classify the phrase in the text to determine a category of the feedback related to content perception. For example, the NLU component 110 may link words and phrases such as "sound," "hear," and "voice" to audio quality perception and link words and phrases such as "clear," "fuzzy," and "color" to video quality perception. In yet another example, NLU component 110 may link words and phrases such as "broke up," "cut out," and "connection" to network quality or signal strength. In some embodiments, a separate classification component can classify the phrase in the text to determine the category of the feedback. The classification component can be a learning algorithm, such as a machine learning algorithm, artificial intelligence algorithm, and/or other statistical modeling algorithm, that receives the phrases from the NLU component 110.

If the content is video content, then a gesture determination component can interpret gestures by the user in the video to derive feedback expressed by the user. For example, if the user shrugs, cups his/her ears, points to his/her ears, etc., the gesture determination component may determine that the user is unable to perceive the audio or video received from the communications service system 104 or that the quality of the perception is low. In addition, if the user gives a thumbs up, an OK symbol, etc., the gesture determination component may determine that the user is able to perceive the audio or video received from the communications service system 104 or that the quality of the perception is high. The gestures can be classified to determine a category of the feedback related to content perception.

In response to detecting the feedback related to the content perception, the user device 102 can be triggered to collect metadata regarding the media session. The metadata can be collected by the metadata component 112 of the user device 102. In some embodiments, the user of the user device 102 may be allowed to use a programmatic interface to opt in to collect and send metadata regarding the media session to the communications service system 104. The metadata can include a identifier of the user device 102 and connection performance information, device feature information, and/or device performance information. The identifier of the user device 102 can include a device name, a user identifier, an IP address, a browser identifier, a MAC address, a user agent, an operating system identifier, and/or hardware characteristics. The identifier of the user device 102 can be used to determine the user associated with the feedback such that adjustments can be recommended to that user. The connection performance information can include download bandwidth, upload bandwidth, activity time, uptime, downtime, signal strength, network name, router identifier, etc. The device feature information can include a type of device, a manufacturer of the device, a model of the device, an operating system type, a firmware version, a fingerprint of the hardware components, a fingerprint of the software packages, etc. The device performance information can include maximum processing capability, maximum storage capability, available processing capability, available storage capability, etc. The metadata is collected to identify potential issues causing low quality perception in the media session or to identify characteristics of a high quality media session. The metadata can be sent to the communication service system 104 for analysis.

In response to detecting the feedback related to the content perception, the user device 102 can also be triggered to collect a content sample of the content. The content sample can be collected by the content capture component 114 of the user device 102. The content sample can be a predetermined duration, such as 5 seconds, 10 seconds, 30 seconds, etc., of the content before the feedback related to the content perception is spoken by the user. In some embodiments, the user of the user device 102 may be allowed to use a programmatic interface to opt in to collect and send the content sample to the communications service system 104. The content sample can be collected in a compressed or uncompressed format, or as a fingerprint of the content sample. The content sample can be sent to the communication service system 104 at the same time as the metadata.

The media session can be, for example, audio conferencing, video conferencing, chatting, gaming services, etc. The communications service system 104 can be implemented in one or more computing systems, such as one or more hosting servers 206 in connection with FIG. 2. In order to execute the media session, the communications service system 104 can receive content from the input device 102, process the content, and broadcast the processed content to other participants in the media session. However, the communications service system 104 does not analyze the words in the content to execute the media session. Rather, the communications service system 104 filters the content to improve audio or video quality, encodes the content, aggregates content from a plurality of sources, etc.

To recommend adjustments to the media session, the communication service system 104 can also receive an indication of feedback, the classification of the feedback, the feedback itself, the metadata, and/or the content sample from the user device 102. The communication service system 104 can also determine network performance information such as availability and/or latency of the network. The network performance information can include packet loss, bandwidth, upload speed, download speed, latency, geographic location of the participants in the media session, geographic location of the hosting server of the media session, etc. The network performance information can be determined by the network performance component 118 of the communication service system 104. In some embodiments, the network performance information, received metadata, and/or content sample are used by an operator associated with the communications service system 104 to determine adjustments that can be made to improve the perceptibility of content by the user of the user device 102. In some embodiments, the network performance information, received metadata, and/or content sample are used by the adjustment determination component 120 to automatically determine adjustments that can be made to improve the perceptibility of content by the user of the user device 102. The adjustments can include changing a modality of connection, changing a connection network, changing a host server of the media session, changing a location of a device receiving the content, changing the input device, changing the modality of the input, changing the output device, changing the modality of output, and/or encoding voice in audio content as text and then playing the text using text-to-speech technology.

The determination of whether the operator determines adjustments or the automatic determination component 120 determines adjustments can be based on the category of the feedback. For example, if the feedback is classified as a faulty network connection, the automatic determination component 120 can recommend for the user to change the connection network. In another example, if the feedback is classified as low quality video, an operator can recommend adjustments because of the many possible sources of the poor video quality. The operator can make recommendations in real-time during the media session or can determine recommendations after the media session for recommendations in subsequent media sessions having the same or similar feedback.

The determination of whether the operator determines adjustments or the automatic determination component 120 determines adjustments can also be done serially. For example, the automatic determination component 120 can determine initial adjustments. If subsequent feedback is received from the user in the same category, thereby indicating that the initial adjustments were not effective, the operator can then determine additional adjustments. The adjustments can be sent to the user device 102 as recommendations to the user and at least one of the adjustments may be implemented automatically by the user device 102.

The communications service system 104 may include a content processing component 122 for processing the content from the input device 102. The content processing component 122 can be, for example, a filter and/or encoder for processing the content. For example, the content processing component 122 can be a noise cancellation filter, an echo cancellation filter, a reverberation filter, a voice filter, an audio encoder, a lighting filter, a focus filter, a crop filter, a color filter, a smoothing filter, and/or a video encoder.

In an embodiment, the communications service system 104 may be implemented on one or more backend servers in the context of the Web services framework. Note, however, that one or more components of the communications service system 104 may be implemented on one or more of the frontend servers. In an embodiment, the communications service system 104 may be exposed as a Web service via a Web service interface that other entities may leverage to perform content processing services, applications, etc. Embodiments of the communications service system 104 may be implemented according to an architecture that is linearly scalable. Embodiments may be scaled quickly and easily with little or no risk of losing usage information, with minimum or no downtime, and without affecting the latency of the overall system.

Figure 2:
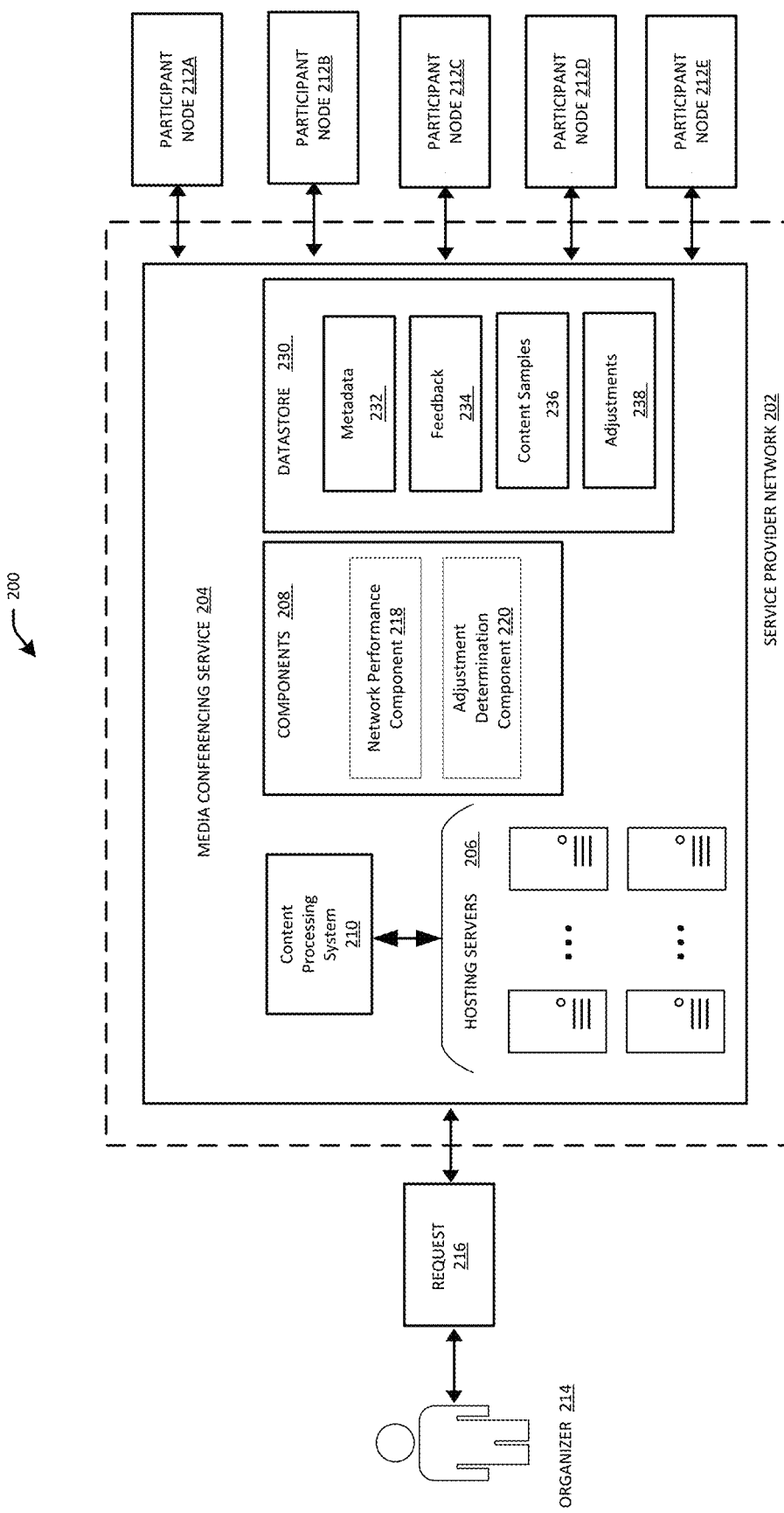
FIG. 2 schematically illustrates a system-architecture diagram of an example service provider network that provides a media conferencing service.

FIG. 2 schematically illustrates an example environment 200 that includes a service provider network 202. The service provider network 202 provides various services to users, such as participant nodes 212A-E, which can be the input device 102 or output devices, or systems including the input device 102 or the output devices. The service provider network 202 can include various types of computing resources, such as data processing resources like data storage resources, networking resources, data communication resources, network services, and the like. Common expressions associated with the service provider network may include, for example, "on-demand computing," "software as a service (SaaS)," "cloud services," "data centers," and so forth. Services provided by the service provider network 202 may be distributed across one or more physical or virtual devices.

In the example environment 200, the service provider network 202 includes a media conferencing service 204, such as an audio or video conferencing service. The media conferencing service 204 may include multiple hosting servers 206. In some embodiments, the media conferencing service 204 also includes components 208, a content processing system 210, and a datastore 230. The components 208 may include a network performance component 218 that corresponds to the network performance component 118 of FIG. 1 and an adjustment determination component 220 that may correspond to the adjustment determination component 120 of FIG. 1. The media conferencing service 204 may facilitate initiation of the media conference or may otherwise allow the media conference to take place via hosting servers 206.

Multiple participant nodes 212A-E are illustrated in the example environment 200. The participant nodes 212A-E represent participants, input devices, output devices, clients, bots, and/or users for media conferences provided by the media conferencing service 204. The participant nodes 212A-E interact with the media conferencing service 204 and the hosting servers 206 via electronic devices such as, for example, smart phones, tablets, laptop computers, desktop computers, telephones, etc. In some embodiments, at least one of the participant nodes 212A-E may be a bot that is configured to interact in the video conference instead of a human participant. Text, audio, and/or video content can be sent between the participant nodes 212A-E via the media conferencing service 204. The media conference may be part of a gaming platform.

When one or more of the participant nodes 212A-E wishes to participate in a media conference, an organizer 214 of the media conference may send a request 216 for the media conference to the media conferencing service 204.

The organizer 214 may also be a participant in the media conference. Content processed by the media conferencing service 204 can be broadcast to one or more of the participant nodes 212A-E simultaneously.

Information from the content processing system 210 can be sent to the datastore 230, or information can be sent from the datastore 230 to the content processing system 210. For example, the datastore 230 can include a metadata database 232 to store metadata received from the input device 102. The datastore 230 can also include a feedback database 234, which may store phrases indicative of feedback related to content perception received from the input device 102. These phrases can be used to train the speech processing component 106 and, in particular, the NLU component 110. With training over time, the NLU component 110 can more accurately identify phrases and more accurately classify the phrases. The datastore 230 can also include a content sample database 236 to store content samples received from the input device 102. The datastore 230 can additionally include an adjustments database 238 to store adjustments for improving content perception quality. One or more of the adjustments stored in the adjustments database 238 can be sent from the media conferencing service 204 to a participant node 212A-E in response to the feedback related to content perception.

The metadata 232, the feedback 234, the content samples 236, and the adjustments 238 may be stored in one or more databases stored in one or more partitions in the datastore 230 such that the metadata 232 may be stored in one partition, the feedback 234 may be stored in a second partition, the content samples 236 may be stored in a third partition, and the adjustments 238 may be stored in a fourth partition. In some embodiments, the metadata 232, the feedback 234, the content samples 236, and the adjustments 238 may be stored in one or more databases stored in a single partition in the datastore 230.

Figure 3:
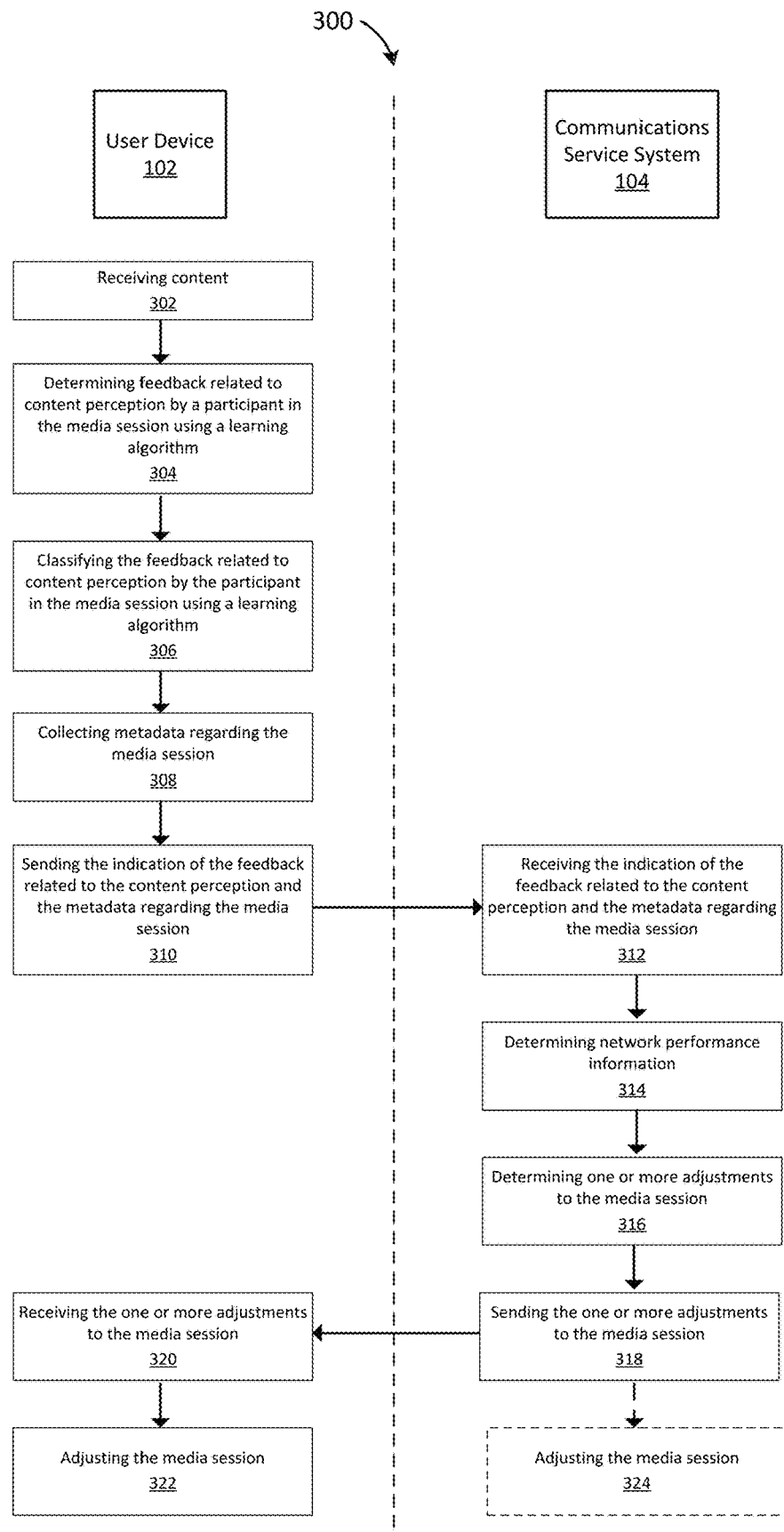
FIG. 3 is a flowchart showing an example process for determining feedback related to content perception by a participant in a media session and determining one or more adjustments to the media session.

FIG. 3 illustrates a flow diagram of an example method 300 that illustrates aspects of the functions performed by the user device 102 and the communication service system 104. The logical operations described herein with respect to FIG. 3 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 3, and described herein. These operations can also be performed in parallel, or in a different order than those described herein. Some or all of these operations can also be performed by components other than those specifically identified. Although the techniques described are with reference to specific components, in other examples, the techniques may be implemented by less components, more components, different components, or any configuration of components.

The example method 300 may be implemented for determining feedback related to content perception by a participant in a media session and determining one or more adjustments to the media session. For example, the method 300 may be implemented to determine one or more adjustments triggered by feedback related to content perception from the user of the input device 102.

At block 302, content is received. The content can be received from the input device 102 or a participant node 212A-E. The content can be received following the establishment of a network service, such as a media session, between the organizer 214 and one of more of the participant nodes 212A-M, or only between the participant nodes 212A-M. The network service can include audio conferencing, video conferencing, chatting, or gaming service. The content can be audio data or video data as part of a media session.

At block 304, feedback relating to content perception by a participant in the media session can be determined using a learning algorithm. Text indicative of speech in the received content is initially determined using automatic speech recognition, as described in greater detail above. In some embodiments, the text can be compared to predetermined phrases that are indicative of feedback related to content perception to determine whether feedback relating to content perception was uttered by the user of the user device 102.

In some embodiments, the text can be analyzed using a natural language understanding algorithm to identify phrases indicative of content perception. The automatic speech recognition algorithm and the natural language understanding algorithm can each or both be implemented as a learning algorithm, such as a machine learning algorithm, artificial intelligence algorithm, and/or other statistical modeling algorithm. The learning algorithm can be trained using a plurality of predetermined phrases that are indicative of content perception. The feedback may indicate that the user is unable to perceive the audio or video content or that that the quality of the perception is low. In some embodiments, the learning algorithm can be a pre-trained model that is received. The quality of the perception may be low due to low data velocity, low packet rate, packet loss, a connection reset, jittering, video artifacts, and/or a loss of video signal. These issues may be caused by a weak wireless internet signal and/or channel contention within a wireless internet network. The feedback may alternatively indicate that the user is able to perceive the audio or video content or that the quality of the perception is high.

The speech recognition and natural language understanding algorithms are performed at the input device 102 for several reasons. First, a user may not opt in to send content for analysis to an external service for privacy reasons. Second, regulatory requirements may not allow for transmission of content for analysis at a third party. For example, a conversation with a doctor may be protected by HIPAA regulations or a conversation with a lawyer may be protected by privilege. Third, the computational processing required to perform the speech recognition and the natural language understanding can be cost prohibitive to performed in the cloud. Fourth, the media session may be encrypted such that the content may not be accessible by the communication service system 104. Therefore, as illustrated in FIG. 1, the speech recognition component 108 and the natural language understanding component 110 are implemented on the input device 102.

At block 306, the feedback related to the content perception by the participant in the media session can be classified using a learning algorithm, such as a machine learning algorithm, artificial intelligence algorithm, and/or other statistical modeling algorithm. The classification can be done by the natural language understanding algorithm or by a separate classifier algorithm. The classification of the content perception can also be one of low audio quality, low video quality, or low network quality. For example, the algorithm may associate words and phrases such as "sound," "hear," and "voice" to audio quality perception and associate words and phrases such as "clear," "fuzzy," and "color" to video quality perception. In another example, the algorithm may associate words and phrases such as "broke up," "cut out," and "connection" to network quality or signal strength.

At block 308, metadata regarding the media session can be collected. In addition, a content sample can be collected. The collection of metadata and the content sample can be triggered by the feedback related to content perception. In other words, metadata and/or content samples are not continually captured by the user device 102, but are only collected in response to the feedback related to content perception. The metadata can include a identifier of the user device 102 and connection performance information, device feature information, and/or device performance information. The identifier of the user device 102 can include a device name, a user identifier, an IP address, a browser identifier, a MAC address, a user agent, an operating system identifier, and/or hardware characteristics. The identifier of the user device 102 or the user of the user device 102 can be used to route determined adjustments. The connection performance information can include download bandwidth, upload bandwidth, activity time, uptime, downtime, signal strength, network name, router identifier, etc. The device feature information can include a type of device, a manufacturer of the device, a model of the device, an operating system type, a firmware version, a fingerprint of the hardware components, a fingerprint of the software packages, etc. The device performance information can include maximum processing capability, maximum storage capability, available processing capability, available storage capability, etc.

In some embodiments, a content sample can also be collected. The content sample can be a predetermined duration, such as 5 seconds, 10 seconds, 30 seconds, etc., of the content before the feedback related to the content perception, i.e., the trigger, is spoken by the user. The content sample can be collected in a compressed or uncompressed format, or as a fingerprint of the content sample.

Figure 4:
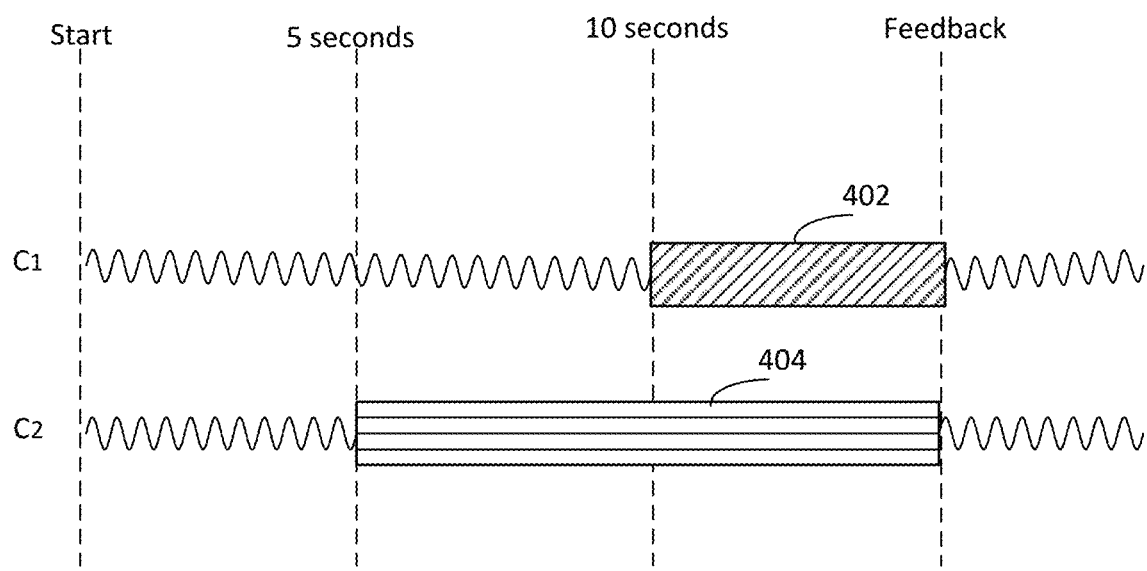
FIG. 4 schematically illustrates content samples collected from different content signals.

For example, FIG. 4 illustrates two content signals $C_1$ and $C_2$. First content signal $C_1$ can be, for example, an audio signal and second content signal $C_2$ can be, for example, a video signal. Both the first content signal $C_1$ and the second content signal $C_2$ are illustrated to start at the same time. However, in some embodiments, the two content signals can start at different times. For example, the second content signal $C_2$ can start after the first content signal $C_1$. The feedback related to the content perception in the first content signal $C_1$ and the second content signal $C_2$ can occur at the same time. Therefore, a first content sample 402 can be collected including the audio content occurring before the feedback related to the content perception. The duration of the first content sample 402 is illustrated as being, for example, five seconds. A second content sample 404 can be collected including the video content occurring before the feedback related to the content perception. The duration of the second content sample 404 is illustrated as being, for example, ten seconds. The duration of the first content sample 402 can be shorter than the duration of the second content sample 404 because the first content signal $C_1$ is an audio signal that may not need as long of a duration for analysis relative to the second content signal $C_2$ that is a video signal. In some embodiments, the duration of the first content sample 402 and the second content sample 404 can be the same.

At block 310, the indication of the feedback related to the content perception and the metadata regarding the media session can be sent to the communication service system 104. The indication of the feedback related to the content perception can, for example, be a flag and can also include the classification of the feedback. In addition, if a content sample is also collected, the content simple can also be sent to the communication service system 104 at block 310. The indication, metadata, and/or content sample is received at the communication service system 104 at block 312.

At block 314, network performance information can be determined by the communication service system 104. The network performance information may include latency with regard to transmission of audio data packets, video packets, and content packets between participant nodes 212A-E, from the participant nodes 212A-E to hosting servers 206, between the hosting servers 206, and between the hosting servers 206 and Internet Service Providers (ISPs) used by the participant nodes 212A-E. Additional performance metrics may include Quality of Service (QoS), the proximity of the participant nodes 212A-E to the various hosting servers 206, performance of potential hosting servers 206, e.g., capacity of the potential hosting servers 206, stability of the potential hosting servers 206, quality of connection to ISPs used by the participant nodes 212, etc. The network performance information can also be used to determine causes of content perception that are based on network communication. The user device 102 may not have access to the network performance information and, therefore, the network performance information can be determined by the communications service system 104.

At block 316, one or more adjustments to the media session are determined. The one or more adjustments to the media session can include changing a modality of connection, changing a connection network, changing a host server of the media session, changing a location of the input device receiving the content, changing the input device, changing the modality of the input, changing the output device, changing the modality of output, and/or encoding voice in audio content as text and then playing the text using text-to-speech technology. The adjustments to the media session can be determined by a human operator or automatically using, for example, a learning algorithm, as described in greater detail above.

In one example, if the classification or the metadata indicates that a signal strength of the wireless internet connection is low, a recommended adjustment can be to move the user device closer to an internet access point. In another example, if the classification or the metadata indicates that a signal strength of the wireless internet connection is low, a recommended adjustment can be to switch to a wired ethernet connection. In yet another example, if the metadata indicates that the bandwidth of the internet connection is weak, a recommended adjustment can be to switch the connection network. In another example, if a majority of the participants in the media session are located far away from the host server, a recommended adjustment can be to change the geographic location of the host server to reduce the latency associated with the media session. In yet another example, if the metadata indicates that the volume of the content is low, a recommended adjustment can be to switch to another output device. In some embodiments, a plurality of adjustments can be determined. For example, if the metadata indicates that a signal strength of the wireless connection is low, a plurality of recommended adjustments can include moving the user device and changing the connection network.

At block 318, the one or more determined adjustments can be sent to the user device for action by the user and/or for automatic implementation by the input device. The one or more adjustments are received at the user device 102 at block 320.

At block 322, the media session can be adjusted based on the received one or more adjustments. In some embodiments, a user can review the one or more adjustments on a graphical user interface of the input device 102. The user that can then choose to implement any one of the adjustments sequentially or at the same time. For example, the user may first move the user device 102 to a location closer to the internet access point. If the perception of content quality does not improve, then the user may switch the connection network. In some embodiments, the user device 102 may automatically implement one or more of the adjustments. For example, the user device 102 may automatically change the connection network without user intervention.

In some embodiments, the one or more adjustments can be made on the device that caused the content. For example, if the content received by the user device 102 in block 302 was caused by another participant in the media session, the other participant in the media session may receive the one or more adjustments in block 320. The participant that originated the content can then, for example, change an input device such as a microphone, or change a network connection to improve the quality of the content. The one or more changes by the participant that originated the content can be done manually or automatically without user interaction.

At block 324, optionally, the media session can be adjusted based on the one or more adjustments at the communication service system 104. In some embodiments, a user can review the one or more adjustments on a graphical user interface of the communication service system 104. The user that can then choose to implement any one of the adjustments sequentially or at the same time. For example, the user may change a host server of the media session. In some embodiments, the communication service system 104 may automatically implement one or more of the adjustments. For example, the communication service system 104 may automatically change the host server without user intervention.

Figure 5:
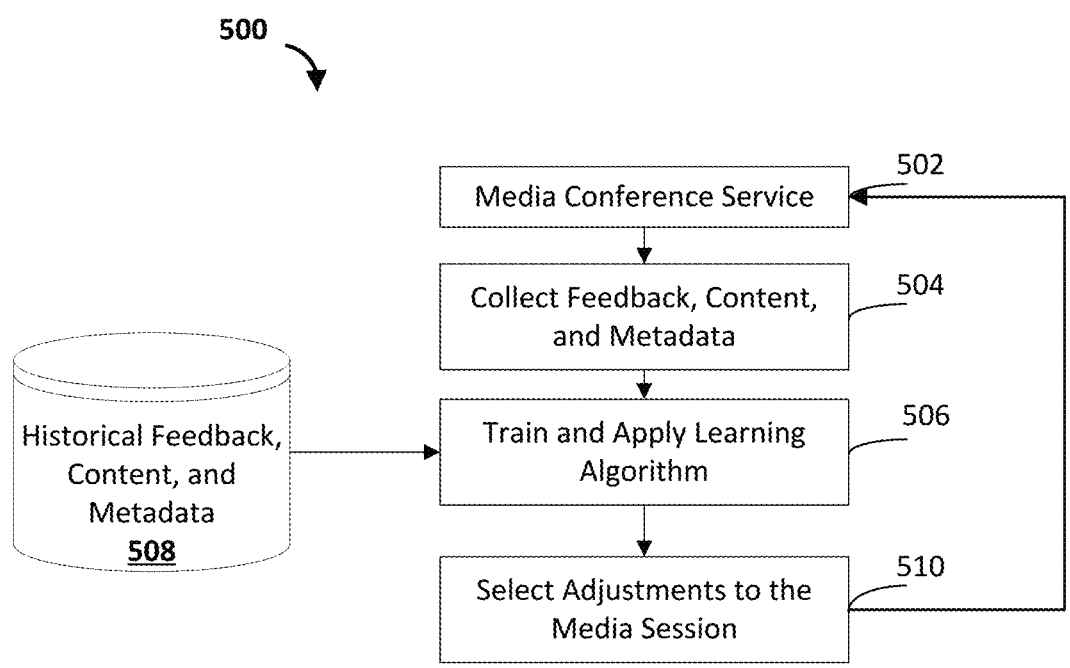
FIG. 5 is a flowchart showing an example process for training a learning algorithm to determine one or more adjustments for a media session.

FIG. 5 is a flowchart showing an example process 500 for training a learning algorithm to determine one or more adjustments to the media session. The logical operations described herein with respect to FIG. 5 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 5, and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

At session 502, a media session is hosted by the hosting servers 206. As part of the media conference, one or more content signals are received from one or more input devices, such as input device 102 or participant nodes 212A-E, processed, and sent to one or more output devices or participant nodes 212A-E. The input devices, such as input device 102, can determine a phrase indicative of feedback related to concept perception by user of the input device, as explained in greater detail above.

At block 504, the indication of the feedback related to the content perception, the metadata regarding the media session, and/or the content sample to be collected and sent to the communication service system 104. Indication of the feedback can include a category of the feedback.

At block 506, the indication of the feedback, the metadata, and the content sample being collected in real time and the historical feedback, metadata, and content samples stored in the datastore 508 can be used to continually train a learning algorithm, such as a machine learning algorithm, artificial intelligence algorithm, and/or other statistical modeling algorithm. The datastore 508 can correspond to the datastore 230 of FIG. 2. The learning algorithm can be trained to determine one or more adjustments for a media session to improve the perception of content quality.

At block 510, the learning algorithm can be used to determine the one or more adjustments for the media session, as in step 316. This determination can be continually done such that, as new feedback, metadata, and content samples are collected during the network service, the determined adjustments may change for future media sessions.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 3 and 5, and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

Figure 6:
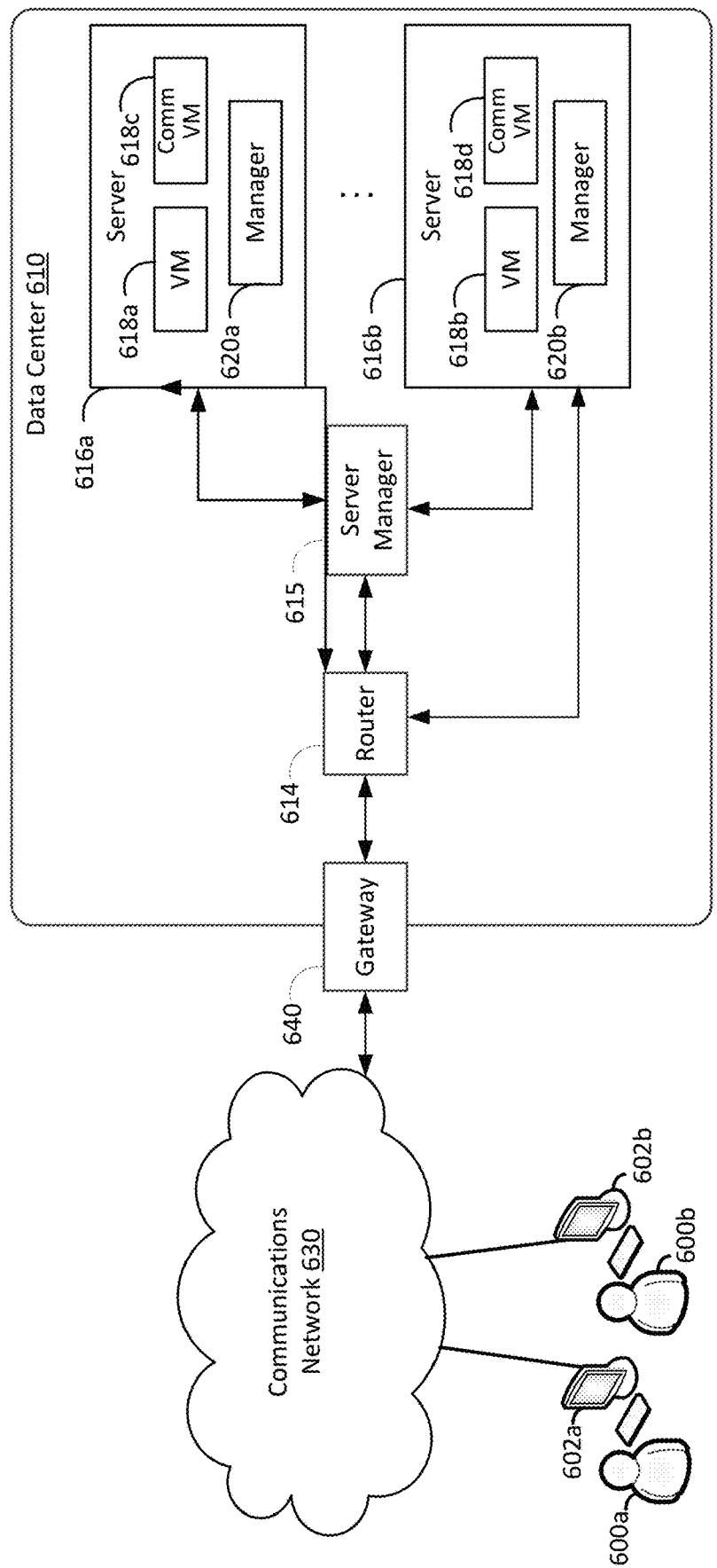
FIG. 6 is a diagram illustrating an example computing environment that may be used in some embodiments.

Referring to FIG. 6, communications network 630 may, for example, be a publicly accessible network of linked networks and possibly operated by various distinct parties, such as the Internet. In other embodiments, communications network 630 may be a private network, such as, a corporate or university network that is wholly or partially inaccessible to non-privileged users. In still other embodiments, communications network 630 may include one or more private networks with access to and/or from the Internet.

Communication network 630 may provide access to computers 602. User computers 602 may be computers utilized by users 600 or other customers of data center 610. For instance, user computer 602a or 602b may be a server, a desktop or laptop personal computer, a tablet computer, a wireless telephone, a personal digital assistant (PDA), an e-book reader, a game console, a set-top box or any other computing device capable of accessing data center 610. User computer 602*a* or 602*b* may connect directly to the Internet (e.g., via a cable modem or a Digital Subscriber Line (DSL)). Although only two user computers 602*a* and 602*b* are depicted, it should be appreciated that there may be multiple user computers.

User computers 602 may also be utilized to configure aspects of the computing resources provided by data center 610. In this regard, data center 610 might provide a gateway or web interface through which aspects of its operation may be configured through the use of a web browser application program executing on user computer 602. Alternately, a stand-alone application program executing on user computer 602 might access an application programming interface (API) exposed by data center 610 for performing the configuration operations. Other mechanisms for configuring the operation of various web services available at data center 610 might also be utilized.

Servers 616 shown in FIG. 6 may be standard servers configured appropriately for providing the computing resources described above and may provide computing resources for executing one or more web services and/or applications. In one embodiment, the computing resources may be virtual machine instances 618. In the example of virtual machine instances, each of the servers 616 may be configured to execute an instance manager 620*a* or 620*b* (which may be referred herein singularly as instance manager 620 or in the plural as instance managers 620) capable of executing the virtual machine instances 618. The instance managers 620 may be a virtual machine monitor (VMM) or another type of program configured to enable the execution of virtual machine instances 618 on server 616, for example. As discussed above, each of the virtual machine instances 618 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 610 shown in FIG. 6, a router 614 may be utilized to interconnect the servers 616*a* and 616*b*. Router 614 may also be connected to gateway 640, which is connected to communications network 630. Router 614 may be connected to one or more load balancers, and alone or in combination may manage communications within networks in data center 610, for example by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 610 shown in FIG. 6, a server manager 615 is also employed to at least in part direct various communications to, from and/or between servers 616*a* and 616*b*. While FIG. 6 depicts router 614 positioned between gateway 640 and server manager 615, this is merely an exemplary configuration. In some cases, for example, server manager 615 may be positioned between gateway 640 and router 614. Server manager 615 may, in some cases, examine portions of incoming communications from user computers 602 to determine one or more appropriate servers 616 to receive and/or process the incoming communications. Server manager 615 may determine appropriate servers to receive and/or process the incoming communications based on factors such as an identity, location or other attributes associated with user computers 602, a nature of a task with which the communications are associated, a priority of a task with which the communications are associated, a duration of a task with which the communications are associated, a size and/or estimated resource usage of a task with which the communications are associated and many other factors. Server manager 615 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 610 described in FIG. 6 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 7:
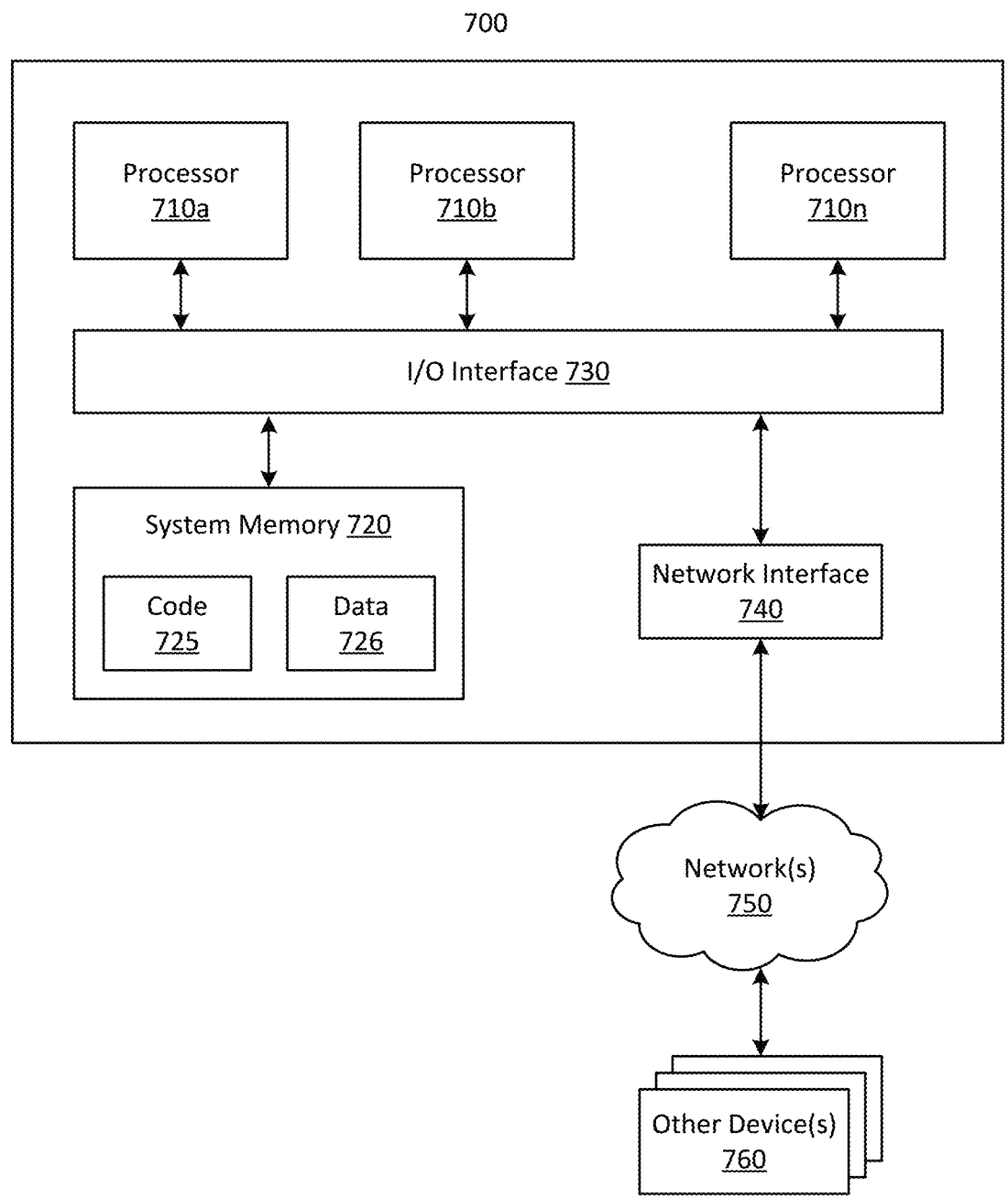
FIG. 7 is a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 7 depicts a general-purpose computer system that includes or is configured to access one or more computer-accessible media. The example computer system of FIG. 7 may be configured to implement one or more of the services platform, such as the input device 102, the communications service system 104, or a combination thereof of FIG. 1. The example computing environment of FIG. 7 may be configured to implement the media conferencing service 204 of FIG. 2. The example computing environment of FIG. 7 may be configured to implement any of the methods described herein, such as any methods (e.g., or any operations) associated with FIGS. 3 and 5.

In the illustrated embodiment, computing device 700 includes one or more processors 710*a*, 710*b* and/or 710*n* (which may be referred herein singularly as "a processor 710" or in the plural as "the processors 710") coupled to a system memory 720 via an input/output (I/O) interface 730. Computing device 710 further includes a network interface 740 coupled to I/O interface 730.

In various embodiments, computing device 700 may be a uniprocessor system including one processor 710 or a multiprocessor system including several processors 710 (e.g., two, four, eight or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC or MIPS ISAs or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash©-type memory or any other type of memory. In the illustrated embodiment, program instructions and data implementing one or more desired functions, such as those methods, techniques and data described above, are shown stored within system memory 720 as code 725 and data 726.

In an embodiment, I/O interface 730 may be configured to coordinate I/O traffic between processor 710, system memory 720 and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks such as analog voice networks or digital fiber communications networks, via storage area networks such as Fiber Channel SANs (storage area networks) or via any other suitable type of network and/or protocol.

In some embodiments, system memory 720 may be a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 700 via I/O interface 730. A non-transitory computer-accessible storage medium may also include any volatile or non-volatile media such as RAM (e.g. SDRAM, DDR SDRAM, RDRAM, SRAM, etc.), ROM (read only memory) etc., that may be included in some embodiments of computing device 700 as system memory 720 or another type of memory. Further, a computer-accessible medium may include transmission media or signals such as electrical, electromagnetic or digital signals conveyed via a communication medium such as a network and/or a wireless link, such as those that may be implemented via network interface 740. Portions or all of multiple computing devices such as those illustrated in FIG. 7 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As an example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method comprising:
   receiving, at a device, content during a media session;
   determining, at the device and using an automatic speech recognition algorithm, a transcript of the content;
   identifying, at the device and based on the transcript, a pre-determined phrase related to content perception by a participant in the media session using a learning algorithm;
   classifying, based on the pre-determined phrase, the content perception into a determined classification of a plurality of classifications comprising a first classification corresponding to audio quality perception, a second classification corresponding to video quality perception, and a third classification corresponding to network quality perception;
   collecting, in response to the identification of the pre-determined phrase related to the content perception, metadata regarding the media session and including at least one of connection performance information, device feature information, or device performance information;
   sending the determined classification and the metadata regarding the media session; and
   receiving, in response to the sending of the determined classification and the metadata regarding the media session, one or more adjustments to the media session.

2. The method of claim 1, wherein identifying the pre-determined phrase related to content perception in the content comprises comparing a plurality of predetermined phrases including the pre-determined phrase to the transcript of the content.

3. The method of claim 1, wherein the learning algorithm is trained using a plurality of predetermined phrases that are indicative of content perception.

4. The method of claim 1, further comprising sending a predetermined duration of the content occurring before the pre-determined phrase related to the content perception.

5. The method of claim 1, further comprising executing the one or more adjustments to the media session.

6. The method of claim 1, wherein the metadata comprises the connection performance information, the device feature information, and the device performance information.

7. The method of claim 1, wherein receiving the content during the media session comprises receiving audio content or video content during the media session.

8. The method of claim 1, wherein the one or more adjustments to the media session comprise changing a modality of connection, changing a connection network, changing a host server of the media session, changing a location of the device receiving the content, changing an input device, changing a modality of input, changing an output device, changing a modality of output, or encoding voice in the content as text and then playing the text using text-to-speech technology.

9. A network service comprising:
   a computing node and a non-transitory computer-readable medium, the non-transitory computer-readable medium having stored therein computer-readable instructions that, upon execution by the computing node, configure the network service to perform operations comprising:
     receiving a determined classification of feedback related to content perception by a participant in a media session and metadata regarding the media session and including at least one of connection performance information, device feature information, or device performance information, wherein the metadata is collected in response to an identification of the feedback related to the content perception, and wherein the feedback related to the content perception is classified, based on an identified pre-determined phrase within content of the media session, into the determined classification from a plurality of classifications comprising a first classification corresponding to audio quality perception, a second classification corresponding to video quality perception, and a third classification corresponding to network quality perception;
     determining network performance information;
     determining, based on the determined classification of the feedback related to the content perception, the metadata regarding the media session, and the network performance information, one or more adjustments to the media session; and
     sending the one or more adjustments to the media session.

10. The network service of claim 9, wherein the computer-readable instructions upon execution further configure the network service to receive a predetermined duration of the content occurring before the feedback related to the content perception.

11. The network service of claim 9, wherein the computer-readable instructions upon execution configure the network service to determine the network performance information by determining network performance for a server hosting a device associated with the participant in the media session.

12. The network service of claim 9, wherein the metadata comprises the connection performance information, the device feature information, and the device performance information.

13. The network service of claim 9, wherein the one or more adjustments to the media session comprise changing a modality of connection, changing a connection network, changing a host server of the media session, changing a location of a device receiving the content, changing an input device, changing a modality of input, changing an output device, changing a modality of output, or encoding voice in the content as text and then playing the text using text-to-speech technology.

14. A non-transitory computer-readable storage medium having stored thereon computer-readable instructions, the computer-readable instructions comprising instructions that, upon execution on one or more computing devices, at least cause:

receiving, at a device, content during a media session;

determining, at the device and using an automatic speech recognition algorithm, a transcript of the content;

identifying, at the device and based on the transcript, a pre-determined phrase related to content perception by a participant in the media session using a learning algorithm;

classifying, based at least in part on the pre-determined phrase, the content perception into a determined classification of a plurality of classifications comprising a first classification corresponding to audio quality perception, a second classification corresponding to video quality perception, and a third classification corresponding to network quality perception;

collecting, in response to the identification of the pre-determined phrase related to the content perception, metadata regarding the media session and including at least one of connection performance information, device feature information, or device performance information;

sending the determined classification and the metadata regarding the media session; and receiving, in response to the sending of the determined classification and the metadata regarding the media session, one or more adjustments to the media session.

15. The non-transitory computer-readable storage medium of claim 14, wherein the instructions, upon execution on the one or more computing devices, cause identifying the pre-determined phrase in the content by comparing the pre-determined phrase to the transcript of the content.

16. The non-transitory computer-readable storage medium of claim 14, wherein the instructions, upon execution on the one or more computing devices, further cause sending a predetermined duration of the content occurring before the pre-determined phrase related to the content perception.

17. The non-transitory computer-readable storage medium of claim 14, wherein the metadata comprises the connection performance information, the device feature information, and the device performance information.

* * * * *